United States Patent
Thodati et al.

(10) Patent No.: US 9,116,775 B2
(45) Date of Patent: Aug. 25, 2015

(54) RELATIONSHIP-BASED DYNAMIC FIRMWARE MANAGEMENT SYSTEM

(71) Applicant: Dell Products L.P., Round Rock, TX (US)

(72) Inventors: Brahmananda R. Thodati, Round Rock, TX (US); Saikrishna M. Kotha, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 21 days.

(21) Appl. No.: 13/895,137

(22) Filed: May 15, 2013

(65) Prior Publication Data

US 2014/0344799 A1  Nov. 20, 2014

(51) Int. Cl.
*G06F 9/44* (2006.01)
*G06F 9/445* (2006.01)

(52) U.S. Cl.
CPC .. *G06F 8/65* (2013.01); *G06F 8/60* (2013.01); *G06F 8/665* (2013.01)

(58) Field of Classification Search
CPC .............. G06F 8/60; G06F 8/65; G06F 8/665
See application file for complete search history.

(56) References Cited

U.S. PATENT DOCUMENTS

| | | | |
|---|---|---|---|
| 8,418,166 B2 * | 4/2013 | Armstrong et al. | 717/168 |
| 8,495,618 B1 * | 7/2013 | Inbaraj et al. | 717/173 |
| 8,555,043 B1 * | 10/2013 | Nallagatla et al. | 713/1 |
| 8,677,343 B2 * | 3/2014 | Averbuch et al. | 717/171 |
| 8,707,297 B2 * | 4/2014 | Brown et al. | 717/178 |
| 8,806,473 B2 * | 8/2014 | Birtwhistle et al. | 717/173 |
| 2005/0005269 A1 * | 1/2005 | Zilavy | 717/170 |
| 2005/0188170 A1 * | 8/2005 | Yamamoto | 711/170 |
| 2008/0184217 A1 * | 7/2008 | Kai | 717/168 |
| 2008/0189693 A1 * | 8/2008 | Pathak | 717/168 |
| 2011/0179407 A1 * | 7/2011 | Minegishi | 717/170 |
| 2012/0216183 A1 * | 8/2012 | Mahajan et al. | 717/170 |
| 2014/0040875 A1 * | 2/2014 | Bower et al. | 717/170 |

OTHER PUBLICATIONS

Kim et al., Remote progressive firmware update for flash-based networked embedded systems, Aug. 2009, 6 pages.*
Makowski et al., Firmware upgrade in xTCA systems, Jun. 2012, 8 pages.*

* cited by examiner

*Primary Examiner* — Thuy Dao
(74) *Attorney, Agent, or Firm* — Haynes and Boone, LLP

(57) ABSTRACT

A system management information handling system (IHS) includes a processing system. A memory system is coupled to the processing system and includes instructions that, when executed by the processing system, cause the processing system to perform a method. The method includes discovering a plurality of components in a networked system and a current firmware image included on each of the plurality of components. The method further includes determining a plurality of relationships between the plurality of components. The method further includes retrieving a firmware compatibility table that includes compatible firmware details for at least one component combination. The method further includes providing an updated firmware image for each of at least a subset of the plurality of components based on the relationships between the subset of the plurality of components and compatible firmware details for the plurality of components.

15 Claims, 8 Drawing Sheets

| PE DEVICE IHS 506 | | LINE MODULE 508 | | RPM 510 | | COMPATIBLE CLIENTs 512 |
|---|---|---|---|---|---|---|
| TYPE | IMAGE | TYPE | IMAGE | TYPE | IMAGE | |
| 1G BaseT POE+ | FTOS v.8.3.x | 10G SFP+ | v8.x | Base RPM | v1.1.x | AP-91(v5.2), AP-93(v5.2) |
| 1G BaseT | FTOS v8.2.x | 10G BaseT /POE+ | v8.3.x | Base RPM | v1.2.x | Server R710(v10.2) |
| 8 Unit Stack PC 7048 | v 5.0 /v4.2.0.19 | 10G SFP+ | v8.x | Integrated RPM | v2.x | Notebook 660s, Notebook 660 |
| No PE (Direct Connection) | | 10G SFP+ | v8.x | Integrated RPM | v2.x | Virtual servers – servers R820, R720, R910, T620, T710 |

SYSTEM MGMT IHS 500

FIG. 5

RELATIONSHIP-BASED DYNAMIC FIRMWARE MANAGEMENT SYSTEM

BACKGROUND

The present disclosure relates generally to information handling systems, and more particularly to dynamically managing firmware on information handling systems and their components based on relationships between the information handling systems and their components.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are sometimes networked to provide networked systems that may be managed by an administrator. Management of a networked system may be accomplished using system management applications that allow the administrator to monitor the IHSs and their components in the networked system. However, with the numerous variants of components that may be interconnected in the networked system (e.g., port extenders, wireless access points, wireless devices, client devices, etc.), the management of firmware updates across the system components in the networked systems becomes challenging. For example, in the context of tens of thousands of networked devices coupled to an switch IHS, ensuring the compliancy of firmware images across all of the devices via conventional mechanisms utilizing manual updates is extremely time consuming and error prone.

Accordingly, it would be desirable to provide an improved firmware management system for networked IHSs.

SUMMARY

According to one embodiment, a system management information handling system (IHS) includes a processing system; and a memory system that is coupled to the processing system and that includes instructions that, when executed by the processing system, cause the processing system to perform a method including: discovering a plurality of components in a networked system and a current firmware image included on each of the plurality of components; determining a plurality of relationships between the plurality of components; retrieving a firmware compatibility table that includes compatible firmware details for at least one component combination; and providing an updated firmware image for each of at least a subset of the plurality of components based on the relationships between the subset of the plurality of components and compatible firmware details for the plurality of components.

BRIEF DESCRIPTION OF THE DRAWINGS

FIG. 5 is a table view illustrating an embodiment of firmware compatibility for a plurality of networked systems.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
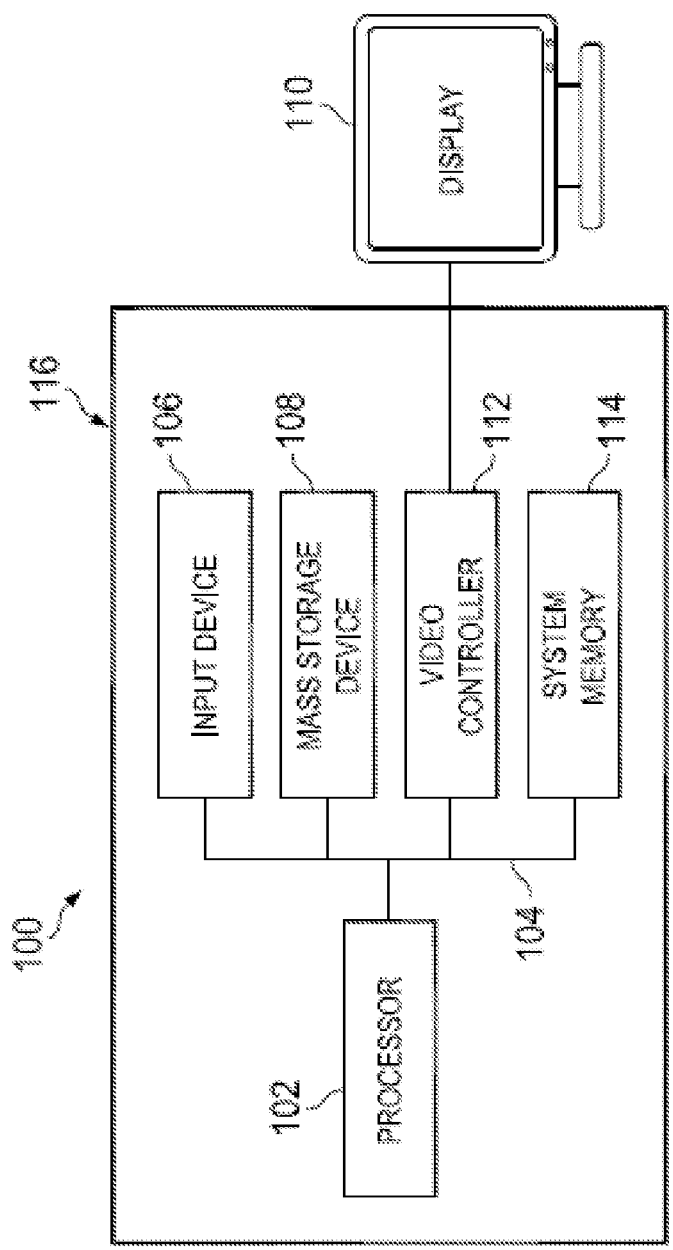
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
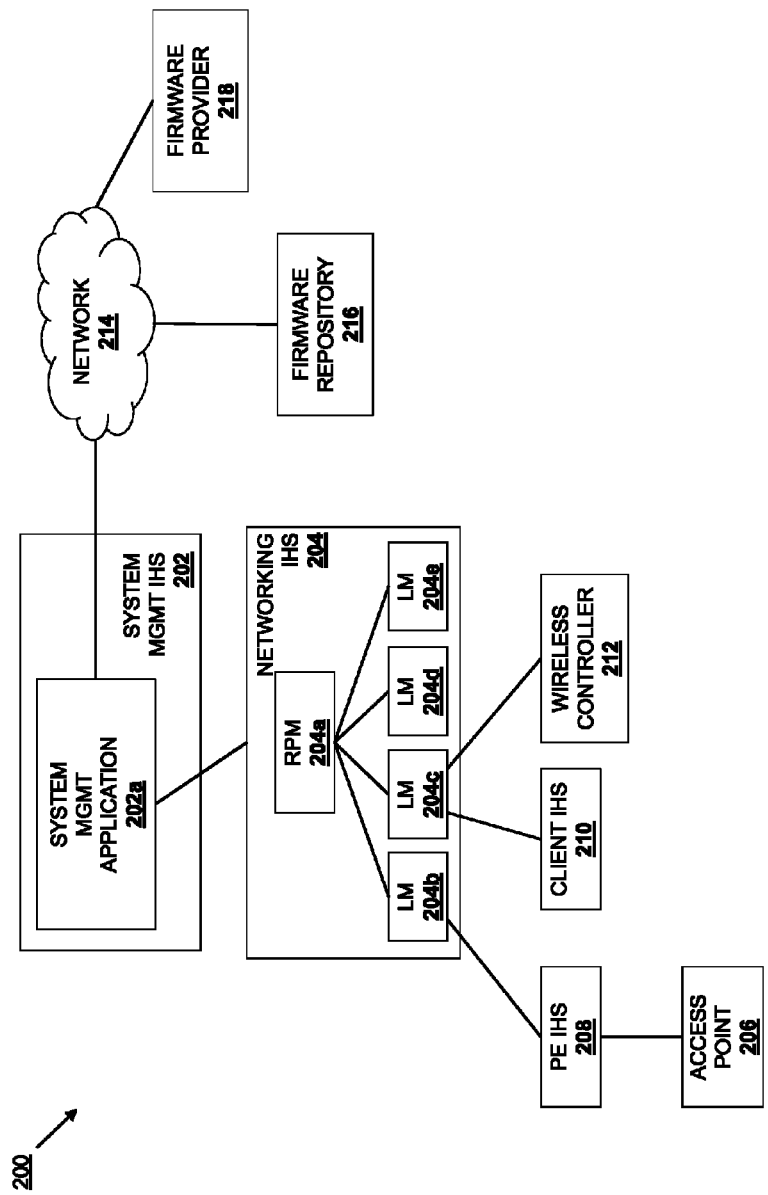
FIG. 2 is a schematic view illustrating an embodiment of a networked system.

Referring now to FIG. 2, an embodiment of a networked system 200 is illustrated. In the illustrated embodiment, the networked system 200 includes a system management IHS 202 coupled to a networking IHS 204 that is coupled to an access point 206 through a port extender IHS 208, a client IHS 210, and a wireless controller 212. The system management IHS 202 is also coupled to a network 214 that is coupled to a firmware repository 216 and a firmware provider 218. One of skill in the art will recognize the illustrated embodiment of the networked system 200 as a very simple networked system with few components that has been provided herein for clarity of illustration and discussion, and that much more complicated networked systems with many more components will fall within the scope of the present disclosure. In an embodiment, the system management IHS 202 may include some or all of the components of the IHS 100, discussed above with reference to FIG. 1. For example, the system management IHS 202 may be a portable/laptop/notebook IHS, a desktop IHS, and/or a variety of other IHSs. The system management IHS 202 includes a system management application 202a that may be provided by instructions that are stored on a memory system (e.g., the system memory 114 and/or the storage device 108 discussed above with reference to FIG. 1, or other non-transitory computer-readable mediums known in the art) and that, when executed by a processing system (e.g., the processor 102 discussed above with reference to FIG. 1) cause the processing system to perform the functions of the system management IHS 202 and the system management application 202a discussed below.

The system management IHS 202 may be coupled to the networking IHS 204 directly (e.g., through a direct wired or wireless connection), over a network (e.g., a local area network (LAN), the Internet, etc.), and/or in a variety of methods known in the art. As such, each of the system management IHS 202 and networking IHS 204 include communications systems and communications interface that are not shown in FIG. 2 for clarity of illustration and discussion. In an embodiment, the networking IHS 204 may include some or all of the components of the IHS 100, discussed above with reference to FIG. 1. For example, the networking IHS 204 in the illustrated embodiment is a switch IHS that includes a route processor module (RPM) 204a that is coupled to a plurality of line modules (LMs) 204b, 204c, 204d, and 204e. One of skill in the art will recognize the illustrated embodiment of the networking IHS 204 as a very simple switch IHS with few components that has been provided herein for clarity of illustration and discussion, and that much more complicated switch IHSs including, for example, additional RPMs, LMs, and other switch components known in the art will fall within the scope of the present disclosure. While not explicitly illustrated in FIG. 2, each of the line modules 204b, 204c, 204d, and 204e include ports through which they may be connected to the port extender IHS 208, the client IHS 210, and the wireless controller 212, either directly as illustrated with the line module 204c, or indirectly through the port extender IHS 208 as illustrated with the line module 204b.

In an embodiment, any of the access point 206, the port extender IHS 208, the client IHS 210, and the wireless controller 212 may include some or all of the components of the IHS 100, discussed above with reference to FIG. 1. For example, the access point 206 may include a wireless access point that is operable to provide connections to the networked system 200 to a variety of IHSs known in the art. The port extender IHS 208 may be an IHS that connects to one or more ports on the line module 204b and provides additional ports for the connection of the access point 208 (and/or additional client IHSs 206, wireless controllers 212, and/or other network components) in order to increase or "extend" the number of ports on the networking IHS 204. The client IHSs 210 may be portable/laptop/notebook IHSs, desktop IHSs, server IHSs, storage IHSs, and/or a variety of other IHSs known in the art. The wireless controller 212 may be may be a wireless local area network (LAN) management controller that is operable to manage multiple access points, controller clustering, organizing, optimizing, and network healing capabilities, as well as security mechanisms and/or a variety of other wireless controller functionality known in the art.

The network 214 may be a LAN, a wide area network (WAN), the Internet, and/or a variety of other networks known in the art. The firmware repository 216 may be a network-connected storage device, database, or other data storage repository known in the art that may receive firmware, firmware compatibilities, and/or other firmware-related information from one or more firmware providers 218 that may include device manufacturers and/or other firmware providers known in the art.

Figure 3:
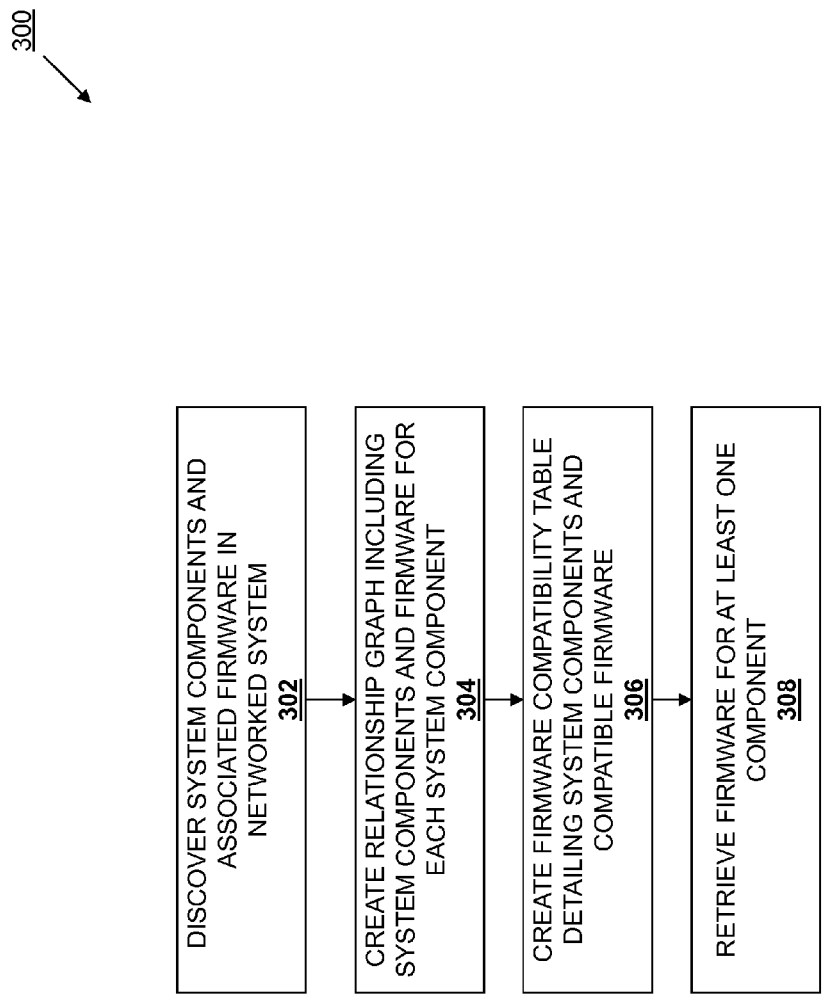
FIG. 3 is a flow chart illustrating an embodiment of a method for dynamically managing firmware in a networked system.

Referring now to FIG. 3, an embodiment of a method 300 for dynamically managing firmware in a networked system is illustrated. In an embodiment, the method 300 is performed by the system management application 202a in the system management IHS 202 to record or "graph" the relationships in the networked system 200 in order to allow the dynamic management of firmware for network components in the networked system 200. As discussed in further detail below, the dynamic management of firmware for network components is enabled by discovering the relationships between those network components in the networked system 200, which also enables for the rapid determination and in some cases automation of firmware provision based on a required firmware for one network component and/or compatibility of firmware between a combination of network components in the networked system 200.

The method 300 begins at block 302 where system components and their associated firmware in a networked are discovered. Referring to FIG. 2, the system management application 202a on the system management IHS 202 may perform block 302 of the method 300 upon connection to the networking IHS 204 to discover the route processor module 204a and the line modules 204b, 204c, 204d, and 204e in the networking IHS 204, the port extender IHS 208, the access point 206, the client IHSs 210, and the wireless controller 212. In an embodiment, the discovery of system components and their associated firmware in the networked system 200 may be accomplished by the system management application 202a through the communication between each of the system components in the networked system 200 and the system management application 202a. For example, an administrator may trigger the discovery of the networked system 200, one or more of its system components, and the current firmware on those system components by entering in an Internet Protocol (IP) address or IP addresses of the system components(s) and leveraging standard protocols implemented by the system components(s) such as, for example, the Simple Network Management Protocol (SNMP). In another example, a system component in the networked system such as the port extender IHS 208, the access point 206, the client IHS 210, the wireless controller 212, etc. may be connected to the networking IHS 204 and, in response, may publish its IP address such that its IP address is transmitted to the system management application 202a. The system management application 202a may then use that IP address to discover that system component and its current firmware, along with other system components, and their respective current firmware, connected to that system component.

The method 300 then proceeds to block 304 where relationships between system components in the networked system are determined to create a relationship graph that includes the system components and their associated firmware. Referring to FIG. 2, the system management application 202a on the system management IHS 202 may perform block 304 of the method 300 either simultaneously with block 302 or following block 302. At block 304, the system management application 202a may determine the physical connectivity relationships between the system components in the networked system 200, including the connections between the route processor module 204a and the line modules 204b, 204c, 204d, and 204e in the networking IHS 204, the connection between the port or ports on the line module 204b and the port extender IHS 208, the connection between the port on the port extender 208 and the access point 206, the connection between the port on the line module 204c and the client IHS 210, and the connection between the port on the line module 204c and the wireless controller 212. In an embodiment, the determination of the relationships between the system components in the networked system 200 may be accomplished by the system management application 202a through the communication between each of the system components in the networked system 200 and the system management application 202a. For example, relationships may be established based on a similarity in the nature of system components in the networked system 200, the type of system components in the networked system 200, the proximity of system components in the networked system 200, the functionality of system components in the networked system 200, and/or a variety of other relationship characteristics known in the art. In an embodiment, relationships may be established between system components based on characteristics that cause those system components to require similar management operations (e.g., configuration operations) for their optimal functioning.

For example, referring to FIG. 2, relationships between system components may include relationships based on physical connectivity between one or more client IHSs, relationships based on the line modules 204b, 204c, 204d, and 204e being the same type of line modules, relationships based on the co-location of the line modules 204b, 204c, 204d, and 204e (e.g., in networking IHS 204, in the same laboratory, etc.) and/or their connection to a co-located device, relationships based on the access point 206 providing wireless access point functionality, etc. A relationship between system components may include a logical connection (e.g., the logical links that connects client IHSs) or communication (e.g., the path used to communicate between client IHSs 210.) A specific example of a relationship in the networked system 200 would be based on the physical connections that connect client IHS 210, the type of line modules connected to the client IHSs 210, and the paths used to communicate between the client IHS 210 and other client IHSs.

Figure 4:
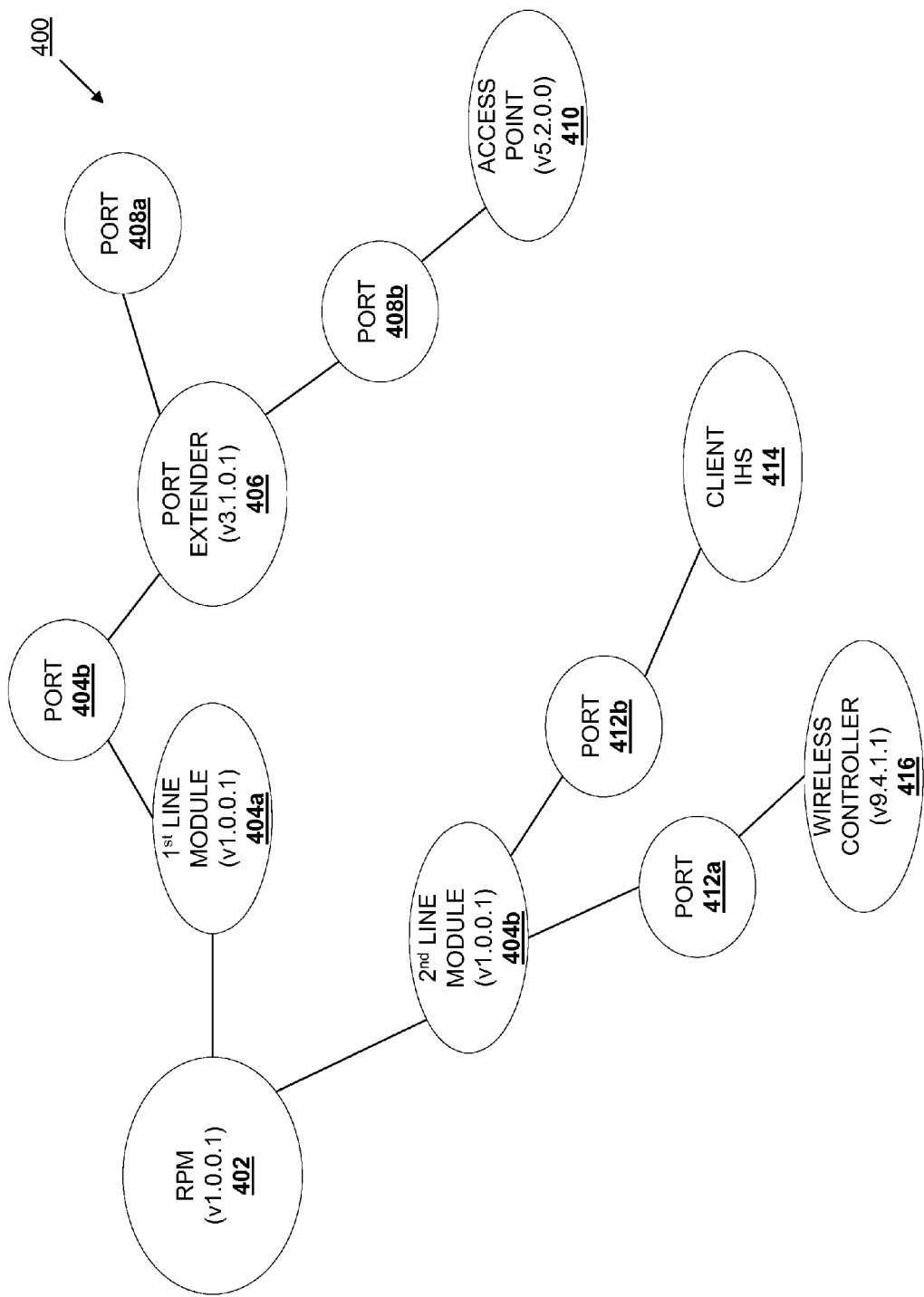
FIG. 4 is a graph view illustrating an embodiment of relationships in a networked system.

Once the relationships between the system components have been determined, block 304 continues such that a relationship-based graph is created. Referring to FIGS. 2 and 4, the system management application 202a uses the system components and their associated firmware discovered in block 302 along with the relationships determined to create a relationship based graph 400. As can be seen from the relationship based graph 400 illustrated in FIG. 4, with reference to the networked system 200 illustrated in FIG. 2, the discovery of system components and their associated firmware in the networked system 200 and the determination of the relationships between the system components result in the relationship based graph 400 including a route processor module 402 with current firmware "v1.0.0.1" (corresponding to the route processor module 204a in the networked system 200), $1^{st}$ line module 404a with current firmware "v1.0.0.1" (corresponding to the line module 204b in the networked system 200) having a relationship with (e.g., a direct physical connection to) the router processor module 402, and $2^{nd}$ line module 404b with current firmware "v1.0.0.1" (corresponding to the line module 204c in the networked system 200) having a relationship with (e.g., a direct physical connection to) the router processor module 402. The relationship based graph 400 also includes a port 404b having a relationship with (e.g., provided on) the line module 404a, a port extender 406 with current firmware "v3.1.0.1" (corresponding to the port extender 208 in the networked system 200) having a relationship with (e.g., a direct physical connection to) the port 404b, ports 408a and 408b having a relationship with (e.g., provided on) the pot extender 406, and an access point 410 with current firmware "v.5.2.0.0" having a relationship with (e.g., a direct physical connection to) the port 408b. The relationship based graph 400 also includes ports 412a and 412b having a relationship with (e.g., provided on) the $2^{nd}$ line module 404b, a client IHS 414 (corresponding to the client IHS 210 in the networked system 200) having a relationship with (e.g., a direct physical connection) the port 412b, and a wireless controller 416 with current firmware "v9.4.1.1" (corresponding to the wireless controller 212 in the networked system 200) having a relationship with (e.g., a direct physical connection to) the port 412a. The relationship based graph 400 may be stored in a memory system in the system management IHS 202.

The relationship based graph may be stored in various formats for various deployment scenarios. In an embodiment, the relationship based graph may be stored in an application database or file system and provided to administrators and/or users access the same system management application instance. In another embodiment, the relationship based graph may be stored in a shared database and may be constructed by different instances of the system management application having access to the shared database. In another embodiment, the relationship based graph may be stored in a shared repository and may be constructed from different instances of the system management application having access to the shared repository within an enterprise. In another embodiment, the relationship based graph may be stored in a public cloud database and may be constructed from system management applications across different networked systems to allow sharing of workflows across enterprises.

As illustrated in FIG. 3, blocks 302 and 304 of the method 300 may be repeated periodically by the system management application 202a to discover new system components as those new system components are connected to the networked system 200. As such, the relationship based graph 400 illustrated in FIG. 4 may be the graph upon connection of the system management IHS 202 to the networking IHS 204, or after a system component (e.g., the client IHS 210) has been added to the networked system 200.

Referring now to FIGS. 3 and 5, the method 300 may then proceed to block 306 where a firmware compatibility table is created that details the system components in the networked system, along with compatible firmware for those system components. FIG. 5 illustrates a system management IHS 500, which may be the system management IHS 202 discussed above with reference to FIG. 2, having a memory system 502 storing a firmware compatibility table 504. In an embodiment, at block 306, the system management application 202a may use the relationship graph 400 to retrieve the system components in the networked system 200 and their interconnections in order to determine the component combination in the networked system 200. For example, in the illustrated embodiment and with reference to the relationship graph 400, the component combination of the networked system 200 includes the RPM 402, the 1$^{st}$ line module 404a, the 2$^{nd}$ line module 404b, the port extender 406, and client devices connected to the 2$^{nd}$ line module 404b (e.g., the wireless controller 416 and the client IHS 414) and the port extender 406 (e.g., the access point 410). Using that information, the system management application 202a may retrieve one or more compatibility details for the component combination and store those compatibility details in the firmware compatibility table 504.

For example, the firmware compatibility table 504 includes a port extender IHS column 506, a line module column 508, an RPM column 510, and a compatible clients column 512. In the illustrated embodiment, each system component column 506, 508, and 510 includes sub columns for a system component type and a system component firmware image, and the compatible clients column 512 includes compatible client IHSs (and in some cases compatible client IHS firmware). Rows of the firmware compatibility table 504 include specific compatibility details based on the system components types and system component firmware included in the component combination.

In the illustrated embodiment, a first set of compatibility details 514a provides compatible client IHSs for component combination including a 1G BaseT POE+ port extender IHS with FTOS v.8.3.x firmware, a 10G SFP+ line module with v8.x firmware, and a base RPM with v1.1.x firmware. For the set of compatibility details 514a, compatible client IHSs includes an access point (AP)-91 with v5.2 firmware or an AP-93 with v5.2 firmware. In the illustrated embodiment, a second set of compatibility details 514b provides compatible client IHSs for component combination including a 1G BaseT port extender IHS with FTOS v.8.2.x firmware, a 10G BaseT/POE+ line module with v8.3.x firmware, and a base RPM with v1.2.x firmware. For the set of compatibility details 514b, compatible client IHSs include a server R710 with v10.2 firmware. In the illustrated embodiment, a third set of compatibility details 514c provides compatible client IHSs for component combination including an eight unit stack PC 7048 port extender IHS with v.5.0 or v4.2.0.19 firmware, a 10G SFP+ line module with v8..x firmware, and an integrated RPM with v2.x firmware. For the set of compatibility details 514c, compatible client IHSs include a notebook 660s or a notebook 660. In the illustrated embodiment, a third set of compatibility details 514d provides compatible client IHSs for component combination including no port extender IHS (i.e., a direct connection to a line module), a 10G SFP+ line module with v8..x firmware, and an integrated RPM with v2.x firmware. For the set of compatibility details 514d, compatible client IHSs include virtual servers R820, R720, R910, T620, and T710.

The compatibility details in the firmware compatibility table 504 may be provided by a manufacturer or manufacturer of system components and stored in a network accessible database (e.g., the firmware repository or other database known in the art.) For example, as is known in the art, IHS manufacturers may publish a variety of compatibility details for many thousands of component combinations and provide those compatibility details for retrieval over a network. In addition, a user, networked system administrator, or other entity may compile compatibility details about component combinations and those compatibility details may be used to create the firmware compatibility table 504 at block 306. Thus, at block 306, the system management application 202a may use the relationship graph 400 to determine a component combination of the networked system such that compatibility details may be retrieved for that component combination in order to determine the compatible components and firmware needed to optimally run the networked system. While only four sets of compatibility details are illustrated in the firmware compatibility table 504 illustrated in FIG. 5, any number of sets of compatibility details may be retrieved depending on those available and the number of components in the networked system, Furthermore, while component type and component firmware image are details in the firmware compatibility table 504, other component details about each component in the networked system/relationship graph may be included in the firmware compatibility table 504 without departing from the scope of the present disclosure.

The method 300 then proceeds to block 308 where firmware is retrieved for at least one component. As discussed with regard to the examples below, the system management application 202a on the system management IHS 202 provides for centralized management and monitoring of the network system 200 to treat its system components as one logical platform. However, because of the numerous varieties of system components that can be coupled to the networking IHS 204, along with the variants of wireless devices, access points, and clients devices, treating the networked system 200 as one logical platform by managing and providing firmware updates across the components in the networked system, while ensuring compliance of firmware images across those components, becomes severely challenging, particular in large data centers where the number of components can exceed ten thousand.

However, utilizing the relationship graph 400 and the firmware compatibility table 504 discussed herein, a variety of benefits are realized in the updating of firmware images and ensuring compliance thereof. In an embodiment, by cross referencing the current firmware included for each system component in the relationship graph 400 with the firmware compatibility table 504, the system management application 202a may identify each component in the networked system 200 that does not include the recommended compatible firmware. In another embodiment, by cross referencing the current firmware included for each system component in the relationship graph 400 with the firmware compatibility table 504, the system management application 202a may identify the components that require firmware updates and retrieve and provide only firmware updates for those components. For example, the system management application 202a may receive or retrieve a firmware bundle including firmware images for a number of components, but may then select portions of the firmware bundle that are needed for specific components in the networked system, and provide those portions to the appropriate components. In another embodiment, the system management application 202a may be used to set policies for the networked system and/or its components. For example, the system management application may set polices that allow a first component to have its firmware updated automatically and regularly, while provided that a second component does not have its firmware updated automatically. In another embodiment, when a new component is added to the networked system 200, the system management application may check compatibility of that component (e.g. component type and component firmware image) with the networked system 200 using the firmware compatibility table 504 and sound an alarm or provide new firmware for that component if it is incompatible or running firmware that is not recommended for the networked system 200.

Figure 6:
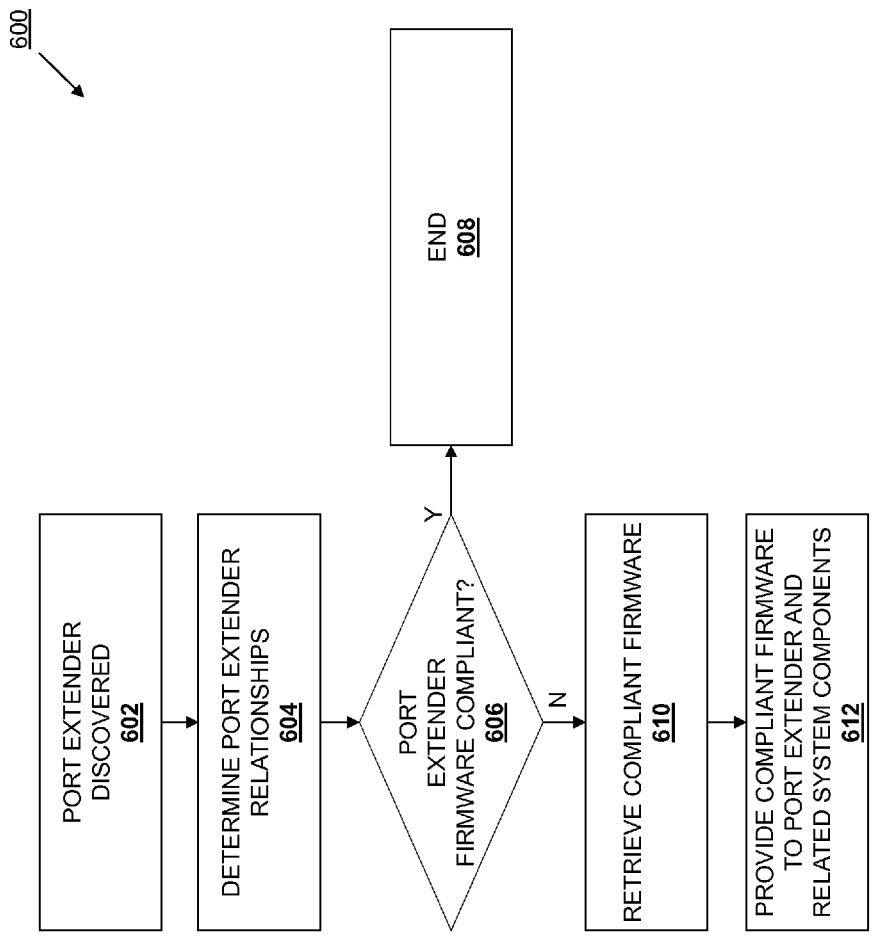
FIG. 6 is a flow chart illustrating an embodiment of a method for discovering a port extender.

Referring now to FIG. 6, an embodiment of a method 600 for discovering a system component in a networked system is illustrated. While the illustrated embodiment involves the discovery of a port extender IHS, one of skill in the art will recognize that any system components may be coupled to the networked system and discovered in substantially the same manner as discussed below for the port extender IHS. The method 600 begins at block 602 where a port extender such as, for example, the port extender IHS 208 discussed above with reference to FIG. 2, is connected to the networked system (e.g., connected to the line module 204*b*), initialized, started up, or otherwise introduced to the networked system. In an embodiment, the discovery of the port extender at block 602 may include a retrieval of a current firmware image included on the port extender (e.g., the firmware "v3.1.0.1" illustrated in FIG. 4.)

The method 600 then proceeds to block 604 where port extender relationships are determined. In an embodiment, a relationship graph such as, for example, the relationship graph 400 discussed above with reference to FIG. 4, may be retrieved, determined, or updated such that the components in the networked system that have relationships with the port extender discovered at block 602 are determined. For example, at block 604, the entire relationship graph 400 of FIG. 4 may be determined substantially as discussed above. In another example, a relationship graph that is similar to the relationship graph 400 of FIG. 4 but not including the port extender 406, the ports 408*a* and 408*b*, and the access point 410, may be retrieved, and the system management application may update that relationship graph to produce the relationship graph 400 that includes the port extender 406, the ports 408*a* and 408*b*, and the access point 410. Thus, in an embodiment of block 604, the relationship graph 400 may be used to determine that the port extender 406 discovered at block 602 is connected to the line module 404*a* with current firmware "v1.0.0.1", the line module 404*a* is connected to an RPM with current firmware "v1.0.0.1", and an access point with current firmware "v5.2.0.0" is connected to port 408*b* on the port extender 406.

The method 600 then proceeds to decision block 606 where it is determined whether the current firmware for the port extender is compliant with the networked system. In an embodiment, using the relationships determined at block 604 (e.g., the relationship graph 400 of FIG. 4), the system management application may use a firmware compatibility table (e.g., the firmware compatibility table 504 of FIG. 5) to determine whether the port extender type and the port extender firmware image are compatible with the system component types and current firmware images for system components it has a relationship with. For example, the system management application 202*a* may use the relationship graph 400 and the firmware compatibility table 504 to determine at decision block 606 whether the type of port extender 406 discovered at block 602 and that current firmware image ("v3.1.0.1") on that port extender 406 is compatible with the type of line module 404*a* and its current firmware "v1.0.0.1", the type of RPM 402 and its current firmware "v1.0.0.1", and the type of access point 410 and its current firmware "v5.2.0.0". In an embodiment, the firmware compatibility table 504 may be created at decision block 606, or retrieved at decision block 606 after previously being created. Determining whether the port extender firmware is compatible or compliant may include retrieving or creating a firmware compatibility table for the component combination (e.g., the RPM 402, line mobile 404*a*, port extender 406, and/or access point 410 combination), and considering the type of each system component, determining whether the current firmware for the type of port extender 406 is in compatibility details that that include the types and current firmware images in at least one set of component details. If the current firmware on the port extender is determined to be compliant at decision block 606, the method 600 proceeds to block 608 where the method 600 ends.

If the current firmware on the port extender is determined to not be compliant at decision block 606, the method 600 proceeds to block 610 where compliant firmware is retrieved. In an embodiment, at block 610, the system management application uses the firmware compatibility table to determine what firmware images on the port extender and/or system components in a relationship with the port extender will provide a compatible networked system and, in response, retrieves those firmware images. For example, the system management application may determine that a new, updated firmware image for the port extender that will make the port extender compliant and compatible with the networked system and, in response, retrieve that new, updated firmware image. In another embodiment, the system management application may determine that different firmware images (from their current firmware images) for the port extender, the RPM, and the line module are necessary to make the networked system compatible and, in response, retrieve those firmware images. As discussed above, firmware bundles for the networked system may be included in the firmware repository, and at block 610, portions of those firmware bundles may be retrieved to retrieve firmware images only for the system components that need those firmware images. Following the retrieval of the compliant firmware at block 610, the relationship graph (e.g., the relationship graph 400 of FIG. 4) may be updated such that the current firmware associated with the system components reflects the firmware images retrieved at block 610. The method 600 then proceeds to block 61 where the firmware images retrieved at block 610 are provided to each system component they were retrieved for. For example, firmware images may be pushed by the system management application to the port extender, related chassis components (e.g., the RPM and the line module), and other components in the networked system (e.g., the access point.)

Figure 7:
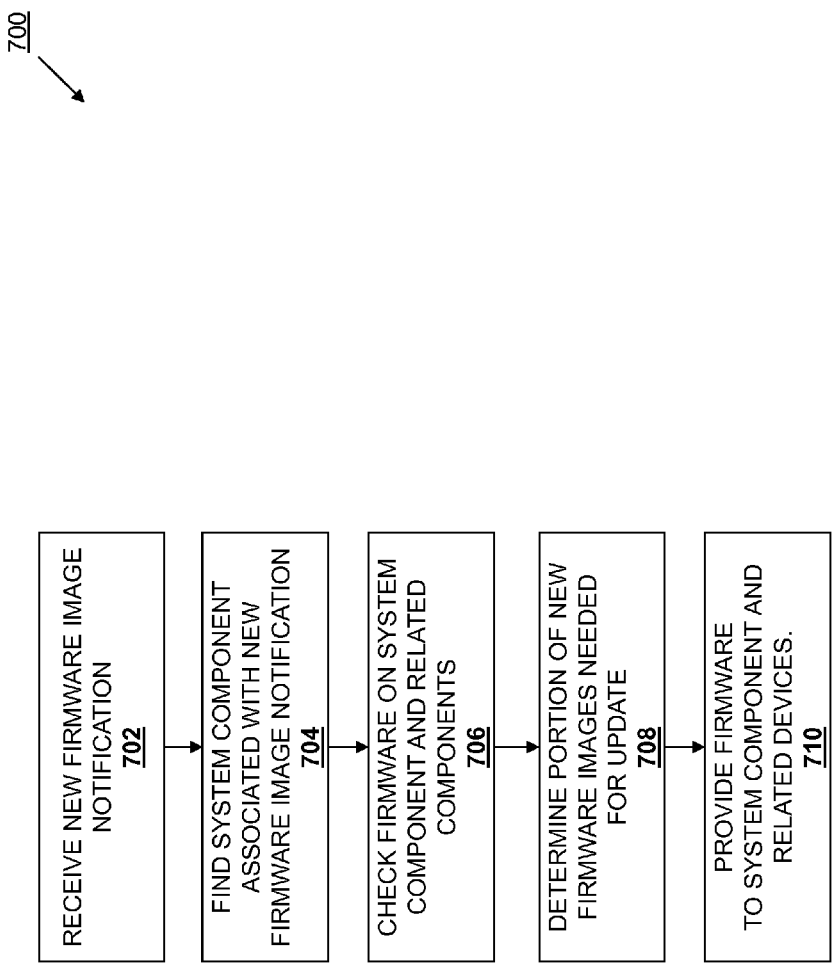
FIG. 7 is a flow chart illustrating an embodiment of a method for receiving firmware update notifications.

Referring now to FIG. 7, a method 700 for receiving a firmware update is illustrated. The method 700 begins at block 702 where a new firmware image notification is received. In an embodiment, the firmware provider 218 (e.g., an IHS or IHS component manufacturer) may add a firmware update or a firmware bundle to the firmware repository 216 and, in response, a new firmware image notification may be sent over the network 214 and received by the system management application 202*a*. In an embodiment, the networked system 200 may be registered with the firmware repository 216 such that any firmware update or firmware bundle that is associated with a component or components in the networked system 200 and that is added to the firmware repository 216 results in a new firmware image notification being sent to the system management application 202*a*.

The method 700 then proceeds to block 704 where the system components associated with the new firmware image notification is found. In response to receiving the new firmware image notification at block 702, the system management application 202*a* determines which of the system components in the networked system 200 is associated with the new firmware image notification. For example, a line module from a line module manufacturer or provider may add new firmware images to the firmware repository 216 for that line module and related components and, in response, a new firmware image notification that includes an identifier for that line module and its related components will be sent to the system management application 202a. Upon receipt of the new firmware image notification, the system management application will determine that the new firmware image notification is associated with the line module and its related components and, in response, find that line module and the related components in the networked system 200.

The method 700 then proceeds to block 706 where the firmware on the system component or components for which the new firmware image notification was received, along with the firmware on related components in the networked system, is checked to determine whether other firmware updates are needed. In an embodiment, the system management application 202a may use the relationship graph 400 for the networked system 200 and the firmware compatibility table 504 to determine whether the new firmware images associated with the new firmware image notification provides a compatible networked system 200 when provided on their associated system components. For example, when a new firmware image notification is associated with a firmware bundle for a plurality of system components, the relationship graph and firmware compatibility table may be used to determine which components in the networked system need firmware updates from the firmware bundle, and whether related components have current firmware that is compatible with the new firmware updates.

The method 700 then proceeds to block 708 where at least a portion of the new firmware images are determined to be needed for updating the system components. Following the determination at block 706 of which components in the networked system need firmware updates from the firmware bundle, and whether related components have current firmware that is compatible with the new firmware updates, the system management application determines a portion of the firmware updates (e.g., from a firmware bundle) that are needed by the components in the networked system, along with any other required firmware (for compatibility purposes) for related components. The method 700 then proceeds to block 710 where the portion of the firmware images, along with other firmware required for compatibility, is provided to the system components and any related devices. Thus, at block 710, the system management application 202a retrieves the portion of the firmware bundle needed to update system components, along with any other firmware for related device (as determined using the relationship table and the firmware compatibility table), and deploys those firmware images across the networked system (but only to the system components that need them.)

Figure 8:
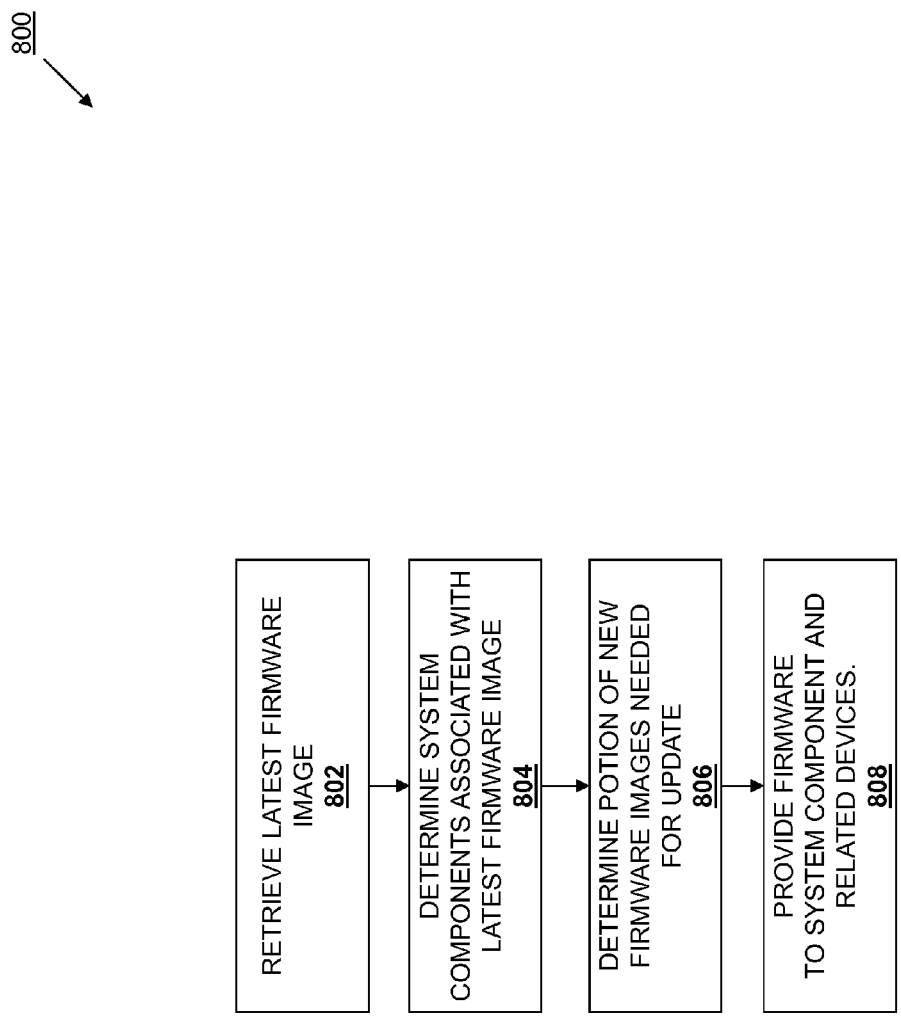
FIG. 8 is a flow chart illustrating an embodiment of a method for retrieving firmware updates.

Referring now to FIG. 8, a method 800 for retrieving a firmware update is illustrated. The method 800 begins at block 802 where the latest firmware images are retrieved from the firmware repository. In an embodiment, at block 802, the system management application 202a may send a request for the most recently updated firmware images for one or more of the system components in the networked system 200. For example, a system administrator may wish to ensure that the networked system is operating with the latest compatible firmware images and, in response, may operate the system management application to send the request for the most recently updated firmware images. In response to the request, the firmware repository 216 may respond by sending a latest firmware images document that details the latest firmware images for the system components in the networked system that are stored in the firmware repository 216.

The method 800 then proceeds to block 804 where the system components associated with the latest firmware images are determined. In response to receiving the latest firmware images document at block 802, the system management application 202a determines which of the system components in the networked system 200 is associated with the latest firmware images detailed in the latest firmware images document. For example, a line module from a line module manufacturer or provider may have added new firmware images to the firmware repository 216 for that line module and related components. Upon receipt of the latest firmware image document, the system management application will determine that the line module and its related components are included in the latest firmware images document and, in response, find that line module and the related components in the networked system 200.

The method 800 then proceeds to block 806 where at least a portion of the latest firmware images detailed in the latest firmware images document are determined to be needed for updating the system components. At block 806, the system management application determines a portion of the firmware updates included in the latest firmware images document that are needed by the components in the networked system, along with any other required firmware (for compatibility purposes) for related components. The method 800 then proceeds to block 808 where the portion of the firmware images in the latest firmware images document, along with other firmware required for compatibility, is provided to the system components and any related devices. Thus, at block 808, the system management application 202a retrieves the portion of the firmware images in the latest firmware images document that are needed to update system components, along with any other firmware for related device (as determined using the relationship table and the firmware compatibility table), and deploys those firmware images across the networked system (but only to the system components that need them.)

Thus, systems and methods have been described that provide a system management application on a system management IHS that operates to determine the relationships between system components in a networked system. Those relationships may then be leveraged to quickly and easily manage firmware updates on the system components in the networked system. Such systems and methods ensure intelligent and dynamic compliance of firmware images across the networked system, while effectively resolving problems associated with conventional manual update mechanisms. The systems and methods also provide an effective method to centrally police, manage, and deploy firmware updates across the networked system, thus ensuring the health and effectiveness of the networked system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A processing system executed method for managing firmware, comprising:
   discovering a plurality of components in a networked system and a current firmware image included on each of the plurality of components;
   determining a plurality of relationships between the plurality of components, wherein the plurality of relationships include a connectivity between the plurality of components and at least one path used to communicate between the plurality of components;

retrieving a firmware compatibility table that includes compatible firmware details for at least one component combination;

selecting a subset of firmware images from a firmware bundle such that an updated firmware image is selected for each of at least a subset of the plurality of components based on the relationships between the subset of the plurality of components that include the connectivity between the plurality of components and the at least one path used to communicate between the plurality of components, and compatible firmware details for the plurality of components;

providing the updated firmware image for each of at least the subset of the plurality of components, detecting that a first component that includes a first current firmware image has been connected to the networked system;

determining that the first current firmware image is not compatible with the networked system using the firmware compatibility table and, in response, providing an alarm; and providing a first updated firmware image for the first component based on the relationships between the first component and the networked system and the compatible firmware details for the first component.

2. The method of claim 1, further comprising:
accessing a firmware repository and determining a second updated firmware image is updated relative to a current firmware image on a second component in the plurality of components, wherein the updated firmware image for each of at least the subset of the plurality of components includes the second updated firmware image for the second component and a third firmware image selected from the firmware compatibility table for a third component in the plurality of components.

3. The method of claim 1, further comprising:
receiving the firmware bundle for the plurality of components in the networked system.

4. The method of claim 1, further comprising:
receiving an updated firmware notification;
determining a second component in the plurality of components that is associated with the updated firmware notification;
determining at least one third component in the plurality of components that has a relationship with the second component; and
requesting updated firmware images for the second component and the third component.

5. The method of claim 1, further comprising:
requesting and receiving a first updated firmware image for a second component in the plurality of components;
determining at least one third component in the plurality of components that has a relationship with the second component; and
requesting a third firmware image for the third component.

6. A system management information handling system (IHS), comprising:
a processing system; and
a memory system that is coupled to the processing system and that includes instructions that, when executed by the processing system, cause the processing system to perform a method including:
discovering a plurality of components in a networked system and a current firmware image included on each of the plurality of components;
determining a plurality of relationships between the plurality of components, wherein the plurality of relationships include a connectivity between the plurality of components and at least one path used to communicate between the plurality of components;
retrieving a firmware compatibility table that includes compatible firmware details for at least one component combination;
selecting a subset of firmware images from a firmware bundle such that an updated firmware image is selected for each of at least the subset of the plurality of components based on the relationships between the subset of the plurality of components that include the connectivity between the plurality of components and the at least one path used to communicate between the plurality of components, and compatible firmware details for the plurality of components;
providing the updated firmware image for each of at least the subset of the plurality of components,
detecting that a first component that includes a first current firmware image has been connected to the networked system;
determining that the first current firmware image is not compatible with the networked system using the firmware compatibility table and, in response, providing an alarm; and
providing a first updated firmware image for the first component based on the relationships between the first component and the networked system and the compatible firmware details for the first component.

7. The system management IHS of claim 6, wherein the method performed by the processing system includes:
accessing a firmware repository and determining a first second updated firmware image is updated relative to a current firmware image on a second component in the plurality of components, wherein the updated firmware image for each of at least the subset of the plurality of components includes the second updated firmware image for the second component and a third firmware image selected from the firmware compatibility table for a third component in the plurality of components.

8. The system management IHS of claim 6, wherein the method performed by the processing system includes:
receiving the firmware bundle for the plurality of components in the networked system.

9. The system management IHS of claim 6, wherein the method performed by the processing system includes:
receiving an updated firmware notification;
determining a second component in the plurality of components that is associated with the updated firmware notification;
determining at least one third component in the plurality of components that has a relationship with the second component; and
requesting updated firmware images for the second component and the third component.

10. The system management IHS of claim 6, wherein the method performed by the processing system includes:
requesting and receiving a first updated firmware image for a second component in the plurality of components;
determining at least one third component in the plurality of components that has a relationship with the second component; and
requesting a third firmware image for the third component.

11. A networked system, comprising:
a first information handling system (IHS);
a second IHS coupled to the first IHS;
a system management IHS coupled to the first IHS, the system management IHS having a memory system including instructions and operable to:
discover the first IHS and the second IHS;
determine a plurality of relationships between a plurality of IHS components in the first IHS and the second IHS, wherein the plurality of relationships include a connectivity between the plurality of IHS components and at least one path used to communicate between the plurality of IHS components;
retrieve a firmware compatibility table that includes compatible firmware details for at least one IHS component combination;
selecting a subset of firmware images from a firmware bundle such that an updated firmware image is selected for each of at least a subset of the plurality of IHS components based on the relationships between the subset of the plurality of IHS components that include the connectivity between the plurality of IHS components and at least one path used to communicate between the plurality of IHS components, and compatible firmware details for the plurality of IHS components;
provide the updated firmware image for each of at least the subset of the plurality of IHS components,
detect that a first IHS component that includes a first current firmware image has been coupled to the plurality of IHS components;
determine that the first current firmware image is not compatible with at least one of the plurality of IHS components using the firmware compatibility table and, in response, provide an alarm; and
provide a first updated firmware image for the first IHS component based on the relationships between the first IHS component and the plurality of IHS components and the compatible firmware details for the first IHS component.

12. The networked system of claim 11, wherein the system management IHS is operable to:
access a firmware repository and determine a second updated firmware image is updated relative to a current firmware image on a second IHS component in the plurality of IHS components, wherein the updated firmware images for each of at least the subset of the plurality of IHS components includes the second updated firmware image for the second IHS component and a third firmware image selected from the firmware compatibility table for a third IHS component in the plurality of components.

13. The networked system of claim 11, wherein the system management IHS is operable to:
receive the firmware bundle for the plurality of IHS components.

14. The networked system of claim 11, wherein the system management IHS is operable to:
receive an updated firmware notification;
determine a second IHS component of the plurality of IHS components that is associated with the updated firmware notification;
determine at least one third IHS component of the plurality of IHS components that has a relationship with the second IHS component; and
request updated firmware images for the second IHS component and the third IHS component.

15. The networked system of claim 11, wherein the system management IHS is operable to:
request and receive a first updated firmware image for a second IHS component of the plurality of IHS components;
determine at least one third IHS component of the plurality of IHS components that has a relationship with the second IHS component; and
request a third firmware image for the third IHS component.

* * * * *